United States Patent [19]
Ohira

[11] Patent Number: 6,064,322
[45] Date of Patent: *May 16, 2000

[54] DEMONSTRATION METHOD AND APPARATUS FOR VEHICLE NAVIGATION

[75] Inventor: Masaaki Ohira, Iwaki, Japan

[73] Assignee: Alpine Electronics, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/606,620

[22] Filed: Feb. 23, 1996

[30] Foreign Application Priority Data

Mar. 28, 1995 [JP] Japan ..................... 7-069676

[51] Int. Cl.$^7$ ................................. G08G 1/123
[52] U.S. Cl. ................ 340/995; 340/988; 701/209; 701/211
[58] Field of Search .................... 340/988, 990, 340/995; 364/449.2, 449.3, 449.5, 449.6; 701/208, 209, 210, 211, 213

[56] References Cited

U.S. PATENT DOCUMENTS

| | | | |
|---|---|---|---|
| 4,504,913 | 3/1985 | Miura et al. | 340/995 |
| 4,737,916 | 4/1988 | Ogawa et al. | 340/995 |
| 4,876,651 | 10/1989 | Dawson et al. | 340/995 |
| 4,888,699 | 12/1989 | Knoll et al. | 340/995 |
| 4,963,864 | 10/1990 | Iihoshi et al. | 340/995 |
| 5,031,104 | 7/1991 | Ikeda et al. | 340/990 |
| 5,043,902 | 8/1991 | Yokoyama et al. | 340/995 |
| 5,113,185 | 5/1992 | Ichikawa | 340/995 |
| 5,311,173 | 5/1994 | Komura et al. | 340/995 |
| 5,315,298 | 5/1994 | Morita | 340/995 |
| 5,398,188 | 3/1995 | Maruyama | 340/995 |
| 5,544,060 | 8/1996 | Fujii et al. | 340/995 |

*Primary Examiner*—Brent A. Swarthout
*Attorney, Agent, or Firm*—Brinks Hofer Gilson & Lione

[57] ABSTRACT

A method of demonstrating navigation for a vehicle navigation apparatus while drawing a map of an arbitrary region limits wear and tear on a CD-ROM drive. When map data for demonstration is read out from a CD-ROM, the map data is stored in a memory and the demonstration is performed. Thereafter, if the demonstration is to be repeated, it is performed by reading out the map data stored in the memory. A demonstration process of reading, from the CD-ROM, data of a map showing a region in which a route along which navigation is to be demonstrated is selected. The functions of the navigation apparatus are presented while displaying the map, so that when a demonstration region is selected, a corresponding demonstration route is created in the demonstration region, and a navigated vehicle mark is moved along the demonstration route while the corresponding map is displayed.

11 Claims, 13 Drawing Sheets

FIG. 2
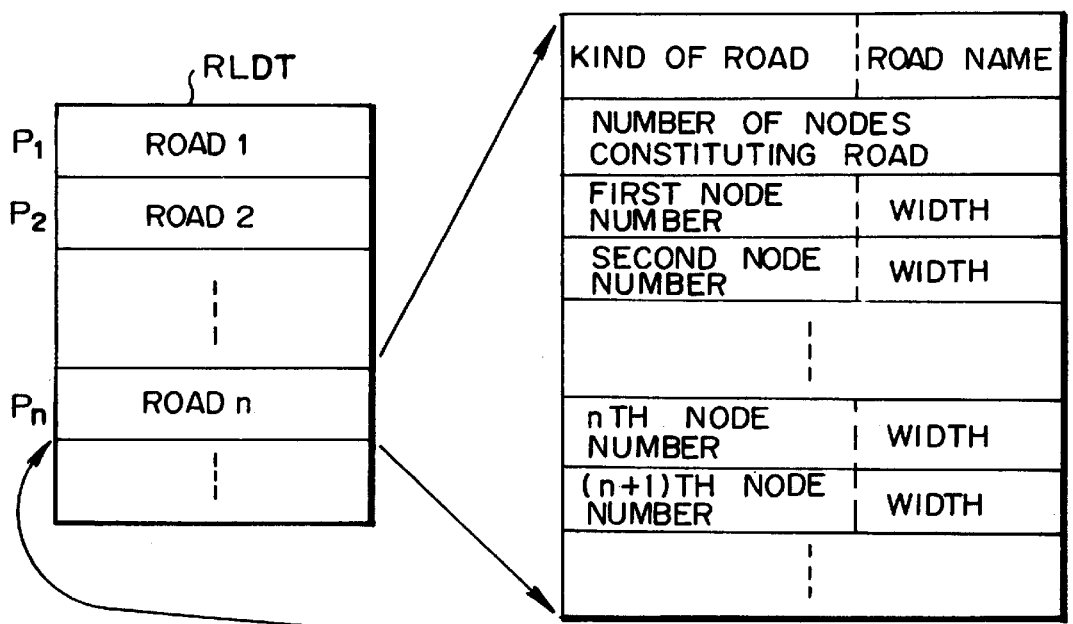
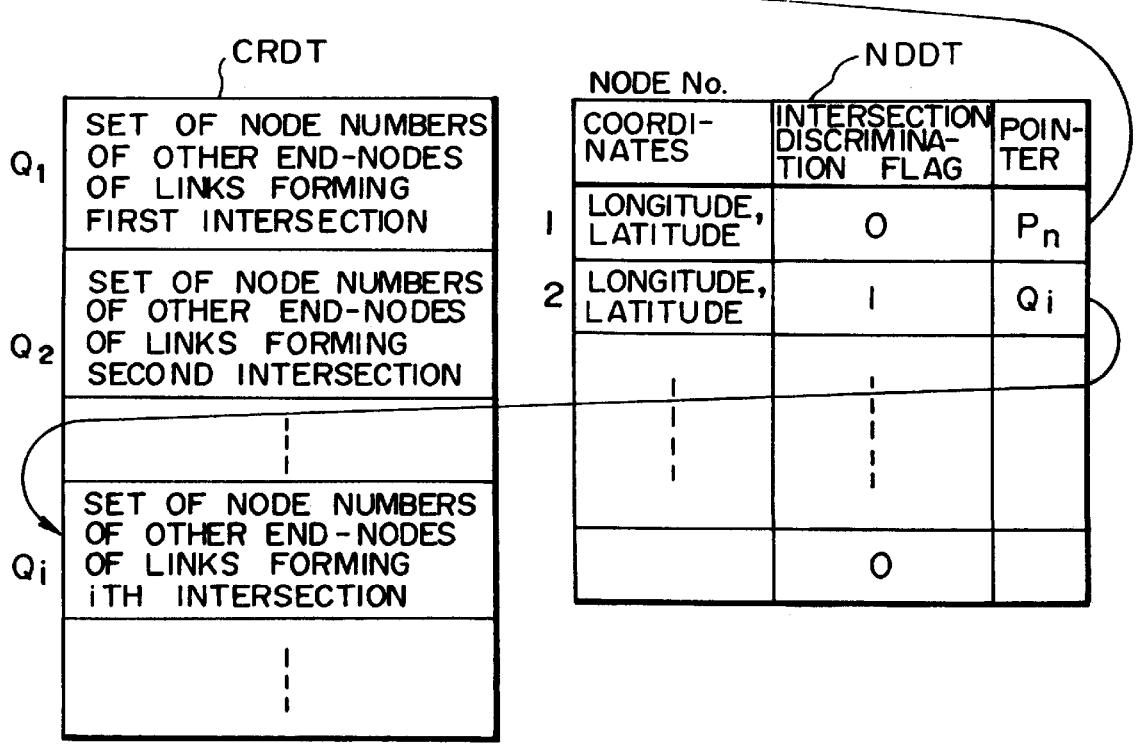

FIG. 5

| SUB MENU \ MAIN MENU | M11 | M12 INFORMATION | M13 ROUTE | M14 SETTING | M15 LIST | M16 |
|---|---|---|---|---|---|---|
| 1 | HEADING-UP | IIS | ROUTE SETTING | MM SETTING | LOCUS LIST | CUSTOMIZATION 1 |
| 2 | NORTH-UP | SATELLITE INFORMATION | GUIDE SETTING | USER'S VEHICLE MARK SETTING | POINT LIST | CUSTOMIZATION 2 |
| 3 | FRONT-WIDE | INF | SIMULATION | DRIVE CHANGING | ROUTE LIST | CUSTOMIZATION 3 |
| 4 | SCALABLE | DEMONSTRATION | REMAINING DISTANCE SETTING | ENVIRONMENT SETTING | KEY MACRO | NORMAL |
| 5 | | | | USER'S HOME SETTING | | |
| 6 | | | | USER'S MARK | | |
| 7 | | | | LOCUS DISPLAY | | |
| 8 | | | | | | |

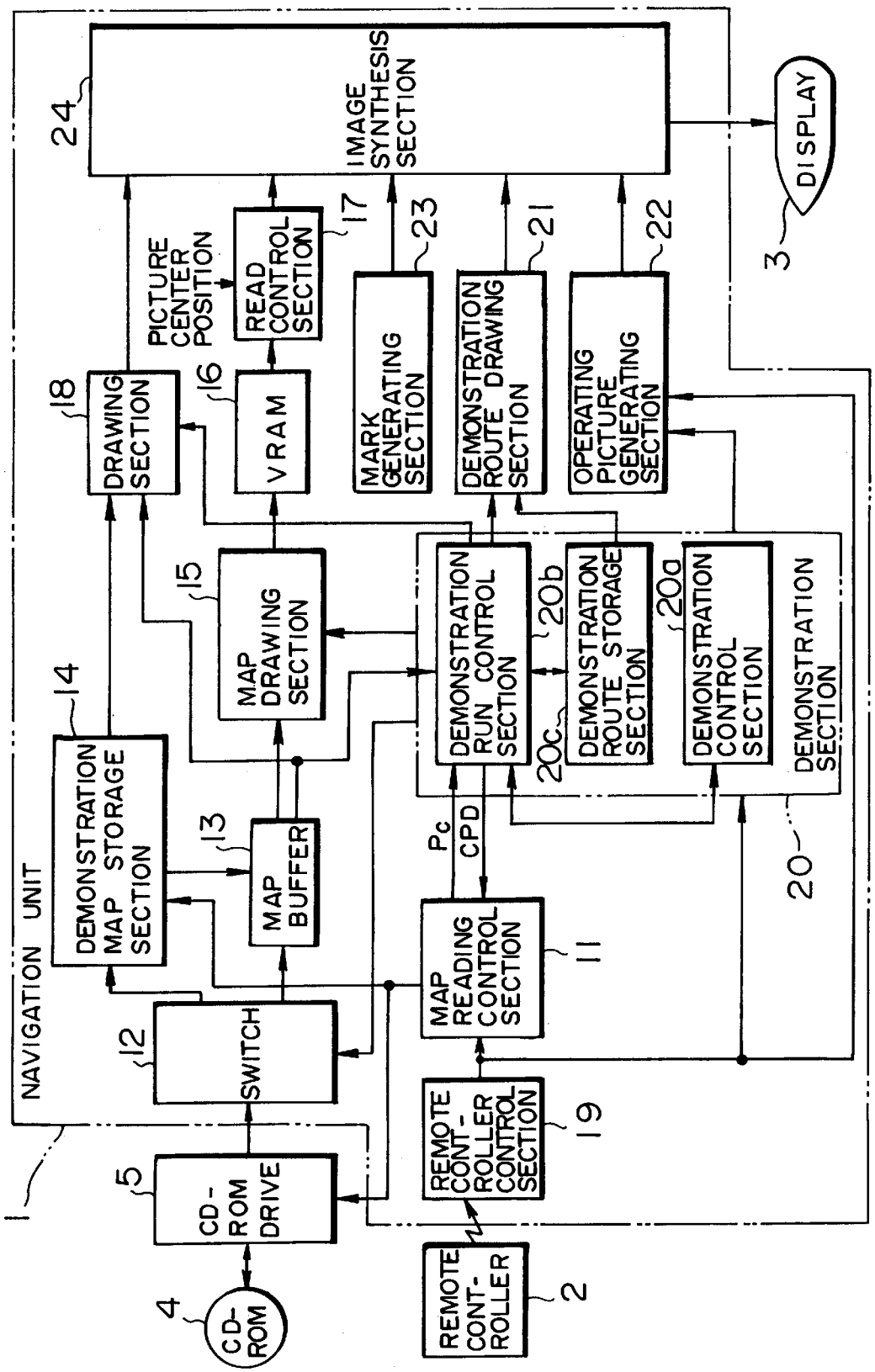

FIG. 7

| LONGITUDE, LATITUDE | INTERSECTION DISCRIMINATION FLAG |
|---|---|
| FIRST NODE (STARTING POINT) | 0 |
| SECOND NODE | 0 |
| THIRD NODE | 1 |
| | |
| kTH NODE | 0 |
| (k+1)TH NODE | 1 |
| | |
| nTH NODE (DESTINATION) | 0 |

20c

DEMONSTRATION METHOD AND APPARATUS FOR VEHICLE NAVIGATION

BACKGROUND OF THE INVENTION

1. Field of the Invention

The present invention relates to an improved user demonstration for a vehicle navigation apparatus and, more particularly, to a demonstration method of reading from a disk map data pertaining to a region in which a route along which navigation is to be demonstrated is selected, and demonstrating to the user functions of the navigation apparatus while displaying the map on a display.

2. Description of the Related Art

In a navigation apparatus which performs vehicle travel guidance to enable a driver to easily drive a vehicle to a selected destination, the position of the vehicle is detected, map data for an area at the vehicle position is read out from a CD-ROM (compact disk read-only memory), and a map image is shown on a display screen while a mark representing the position of the vehicle (the user's vehicle position mark) is superposed on a predetermined portion of the map image. As the position of the vehicle changes with vehicle movement, the vehicle position mark in the image is moved or the map is scrolled while the vehicle position mark is fixed at a predetermined position, for example, at the center of the image, thereby enabling the driver to recognize at a glance the map information of the area at the vehicle position.

This kind of navigation apparatus has various functions, and a driver can use the navigation apparatus by selecting the functions to travel directly to a destination or to travel to the destination via a detour.

The navigation apparatus may have, as well as the essential function of drawing a map around the vehicle position and moving the vehicle position mark along a travel route, a guide route setting and guidance function, a map display method changing function, a travel locus display function, a map matching function, a map reading/drawing function using a point list, and a map enlargement/reduction function.

The guide route setting and guidance function sets a guide route from a starting place to a destination, displays this guide route on the map and performs intersection guidance (displaying enlarged intersection diagrams and traveling directions) to guide a driver to the destination. Guide route setting may be performed by a method in which the navigation apparatus automatically determines an optimal route from a starting place and a destination which have been input, or a method in which the user (driver) determines a route by moving the vehicle position mark along the route from a starting place to a destination by simulation. A guide route set by such a method is maintained in the navigation apparatus by storing in a memory a series of nodes (longitude, latitude) defining the route. While the vehicle is actually traveling, the series of nodes stored in the memory are searched for a guide route formed within a map display area on the screen, and the guide route thereby found is displayed so that the roads defining the route are discriminable from other roads, thereby enabling the driver to select the suitable roads and the direction of travel at each intersection.

The map display method changing function displays a map while changing map display methods so that a driver can easily view the map. A heading-up display, a north-up display, a front-wide display, a scalable display and the like may be used as map displays. The heading-up display displays a map so that the direction of travel coincides with a longitudinal direction toward the top side of the map. The north-up display displays a map so that the top of the map corresponds to the north. The front-wide display widely displays a front area in the direction of travel during the heading-up display. The scalable display displays a map on such a reduced scale that the vehicle position and a subsequent transit point or the vehicle position and a destination can be simultaneously shown in one picture, and in which the reduced scale is automatically changed according to vehicle movement.

The travel locus display function displays a route portion along which the vehicle has travelled by superposing it on the map image on the screen. In the travel locus display function, each time the user's vehicle position detected by a vehicle position detection section changes by a certain distance, the vehicle position (longitude, latitude) at the corresponding time is stored discretely as travel locus data in a travel locus memory. When a map image is shown on the screen, the data representing the travel locus to be indicated in the map image is selected from the travel locus data stored in the travel locus memory and is shown in the form of a series of white dots or the like at the corresponding position in the map image, so that the locus is discriminable. By this travel locus display function, a route along which the vehicle has travelled can be displayed as a series of dots on the roads on the screen. Therefore, for example, this function enables a driver who has driven to a strange place to return easily to his start point by reversely retracing the travel locus. Thereafter, if necessary, the driver may again trace the travel locus as a forward path to easily drive to the same place.

The map matching function corrects the vehicle position by performing map matching as desired using map information and travel locus data. In self-contained navigation (dead reckoning) which involves calculating the vehicle position by using a self-contained navigation sensor, errors can accumulate to such a degree while the vehicle travels that the vehicle position deviates from the corresponding road on the map. Therefore, map matching processing corrects the vehicle position to the corresponding position on the road by collating the travel locus with road data of the map. As the amount of error increases in self-contained navigation, the vehicle position may deviate from the corresponding road to such a large extent that map matching cannot be effected between the vehicle position and the actual present position on the road. In such a case, the vehicle position and the traveling direction for self-contained navigation are corrected by using position data (GPS data) and azimuth data (GPS azimuth) obtained from a global positioning system (GPS) installed in the vehicle. That is, the distance D between the GPS position and the self-contained navigation position is calculated and the distance D and a distance threshold value Dth previously set (e.g., 150 m) are compared. If D>Dth, the vehicle position is corrected by the GPS data and the vehicle position mark is set on the road by map matching processing.

The map reading/drawing function using a point list stores the place of the user's home and other important points, designates a desired point selected from the point list and draws a map about the designated point at a time. The map enlargement/reduction function draws a detailed map, a wide-area map and the like by changing the reduced scale according to the operation of an enlargement/reduction key.

Thus, the navigation apparatus has various functions. Many people who purchase such a navigation apparatus and who are unfamiliar with it may fail to clearly understand its functions and use. Therefore, the navigation apparatus provides to the user a demonstration image for presenting the functions, and the method of using the apparatus is displayed on the display screen when the apparatus is started. Also, the demonstration image can be displayed on the display unit by selection from a menu. To change the display back to the ordinary navigation operation, a key on an operating portion of the system is operated.

Conventionally, navigation is demonstrated as described below. A demonstration region and a demonstration route are fixedly set, previously. A map containing this region is read out from a disk (CD-ROM), to be displayed on the display screen. Simultaneously, the user's vehicle mark is moved at a predetermined speed along the demonstration route (for simulation of traveling) while images for presenting the functions and the utilization method are displayed as desired by being superposed on the map.

This conventional demonstration method has the deficiency that, since the demonstration is performed by displaying a map of a fixed region, it is not easy for a driver unfamiliar with that region to understand the demonstration.

Also, since the demonstration region is fixed, the demonstration cannot be performed if the disk is changed and if the new disk has no map of the demonstration region. For example, in a case where the demonstration region is Tokyo and where a district disk having no map data of Tokyo is used in the apparatus, the demonstration cannot be performed.

Further, the demonstration may be executed repeatedly and continuously, and the disk (CD-ROM) may be accessed each time the demonstration is performed. Therefore, wear and tear on the CD-ROM drive are considerable and its life reduced.

SUMMARY OF THE INVENTION

In view of the above-described problems, one goal of the present invention is to provide a demonstration method which makes it possible to increase the life of the CD-ROM drive by preventing wear and tear on it even when the demonstration is performed repeatedly.

Another goal of the present invention is to perform the demonstration using a map of any area.

To achieve these goals, according one aspect of the present invention, a navigation demonstration method includes the steps of performing a demonstration by storing map data for the navigation demonstration in a memory when the map data is read out from a disk-like medium, and continuing the demonstration if necessary by reading out the map data from the memory.

According to another aspect of the present invention, a demonstration method includes the steps of arbitrarily selecting a demonstration region before the demonstration is performed, forming the demonstration route in the selected region, and performing the demonstration by moving a vehicle mark along the formed demonstration route while displaying the map.

In a demonstration process of reading, out of a disk-like medium, data of a map showing a demonstration region, and presenting functions of a navigation apparatus while displaying the map, the demonstration is performed such that when map data for the demonstration is read out from the disk-like medium, it is stored in a memory, and the demonstration can be repeated by reading out the map data from the memory. In this manner, the CD-ROM drive for reading the disk is not accessed during subsequent demonstration cycles, thereby preventing wear and tear of the CD-ROM drive and extending its life.

In a demonstration process of reading, out of a disk-like medium, data of a map showing a demonstration region, and presenting functions of a navigation apparatus while displaying the map, the demonstration is performed such that the region for the demonstration is selected arbitrarily, a demonstration route is formed in the selected region, and a vehicle mark is moved along the formed demonstration route while the corresponding map is being displayed. With this process, the demonstration can be performed for a region familiar to the driver, so the driver more easily understands the demonstration. Moreover, since the demonstration region can be changed, the demonstration can be performed even if the disk is changed.

BRIEF DESCRIPTION OF THE INVENTION

FIG. 2 is a diagram of the structure of road data in map data;

FIG. 5 is a menu table;

FIG. 6 shows a navigation controller in accordance with the present invention;

FIG. 7 shows an example of the structure of data stored in a demonstration route storage section;

Figure 12A:
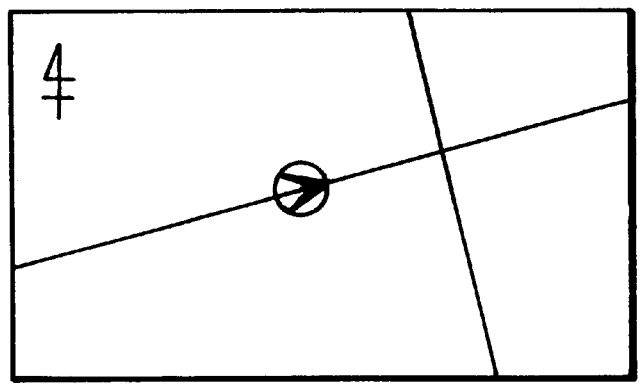
Figure 12B:
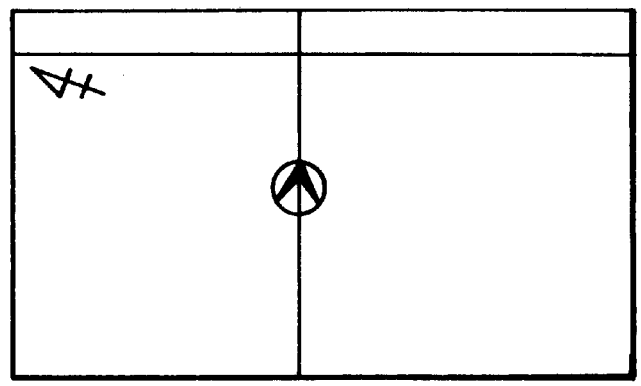
Figure 12C:
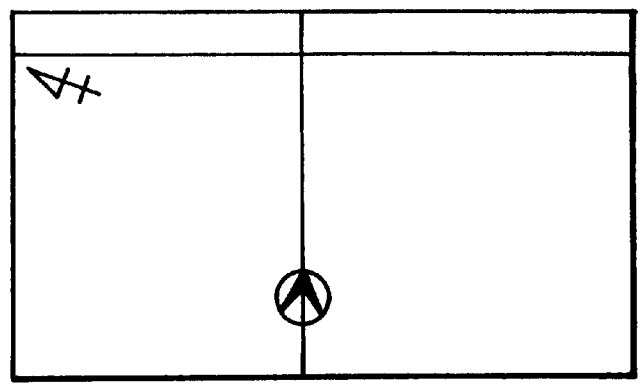
Figure 13:
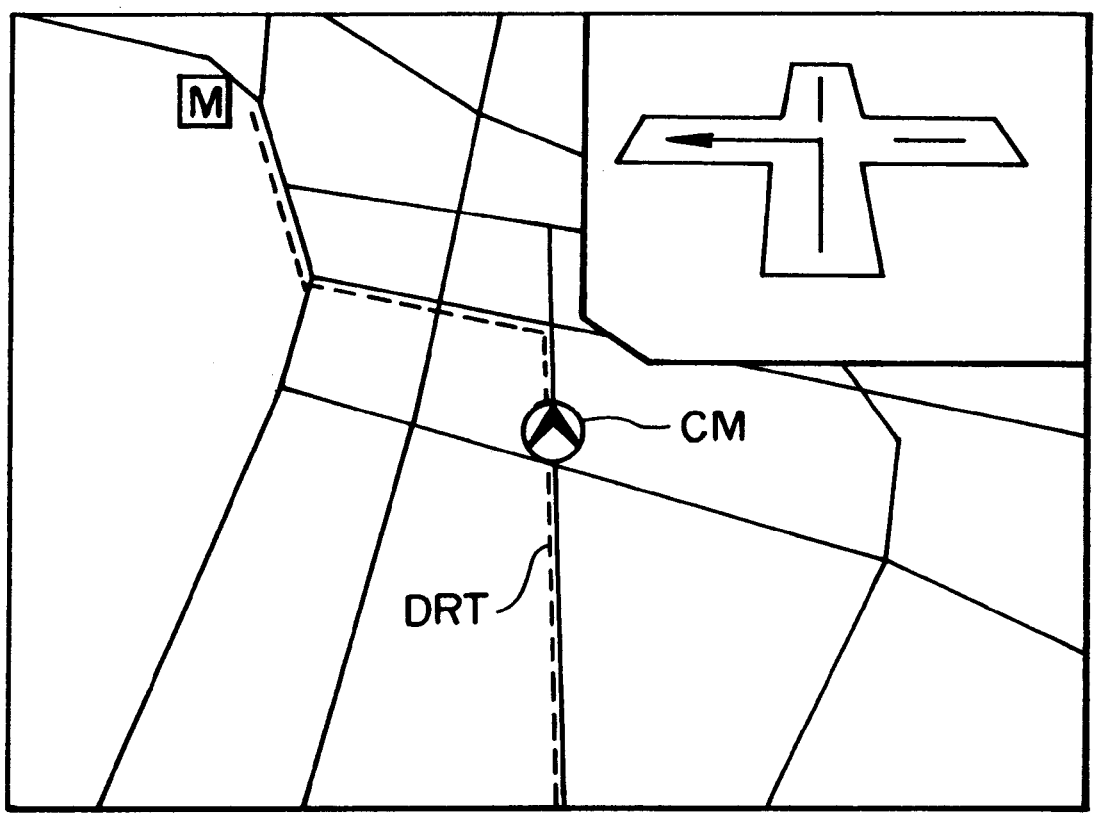

FIGS. 12(*a*), 12(*b*), and 12(*c*) are diagrams of examples of map display by various map display methods; and FIG. 13 is an enlarged intersection diagram.

DETAILED DESCRIPTION (A) Navigation System (a) Entire Configuration

Figure 1:
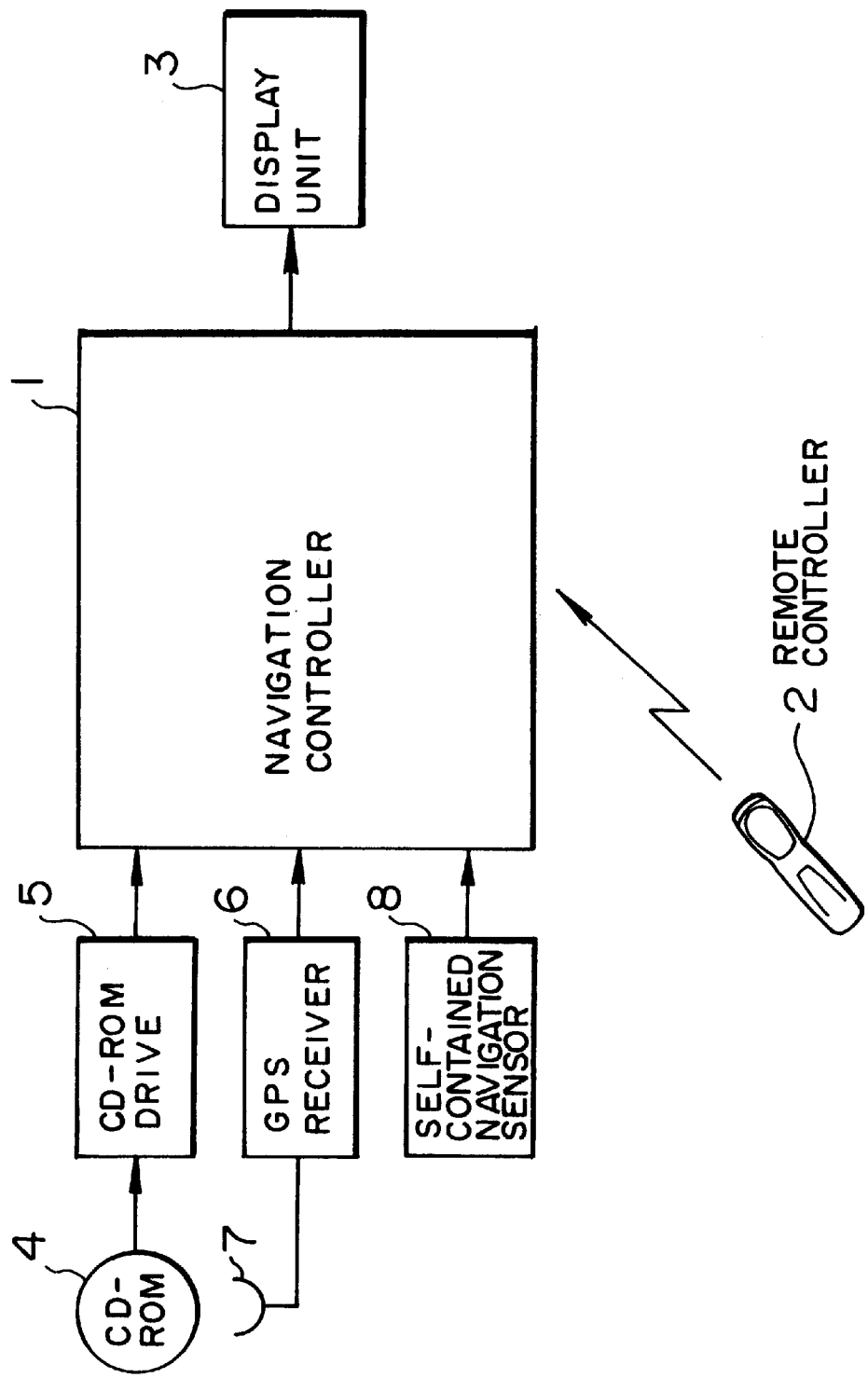
FIG. 1 shows a navigation system to which the present invention is applied.

FIG. 1 shows the entire configuration of a navigation system to which the present invention can be applied. The navigation system includes a navigation controller 1, an operating unit (e.g., a remote controller) 2 for inputting various instructions to the navigation controller, setting a guide route and setting various kinds of data, and a display unit 3 for displaying a map, a guide route, various menus, demonstration images and the like. The navigation system also includes a CD-ROM 4 in which map information is stored, a CD-ROM drive 5, a GPS receiver 6 for receiving radio signals from a satellite to measure the present position and direction of a vehicle, a multiple beam antenna 7 for receiving radio signals from the satellite, and a sensor 8 for self-contained navigation. The GPS receiver 7 calculates the position and direction of the vehicle by a three-dimensional or a two-dimensional position-measuring processing (the direction being obtained as a line connecting the present vehicle position and the vehicle position measured one sampling time ΔT before), and outputs the calculated position and direction along with the position-measuring time. The self-contained navigation sensor 8 includes a relative direction sensor (angle sensor) such as a gyrocompass for detecting the angle of turning of the vehicle, and a distance sensor which generates one pulse each time a predetermined distance is traveled.

The map information includes (1) a road layer, (2) a background layer for displaying objects on a map, (3) a character layer for displaying names of cities, towns, villages and the like, (4) an integrated information service (IIS) layer for storing IIS information. Of these layers, the road layer has, as shown in FIG. 2, road link data RLDT, node data NDDT and crossing data CRDT.

Road link data RLDT is provided as information on attributes of links between roads and includes a total number of roads in a road link, the numbers of nodes forming each road, road numbers (road names) and the kinds of road (national road, expressway, prefectural road and so on).

Crossing data CRDT is a set of nodes closest to each intersection on a map (intersection forming nodes) in the nodes of links connecting to the intersection. Node data NDDT is a list of all nodes forming each road and has, with respect to each node, position information (longitude, latitude), an intersection discrimination flag for indicating whether the node corresponds to an intersection, and a pointer which designates intersection data if the node corresponds to an intersection or designates the road link to which the nodes belongs if the node corresponds to no intersection.

(b) Remote Controller

Figure 3:
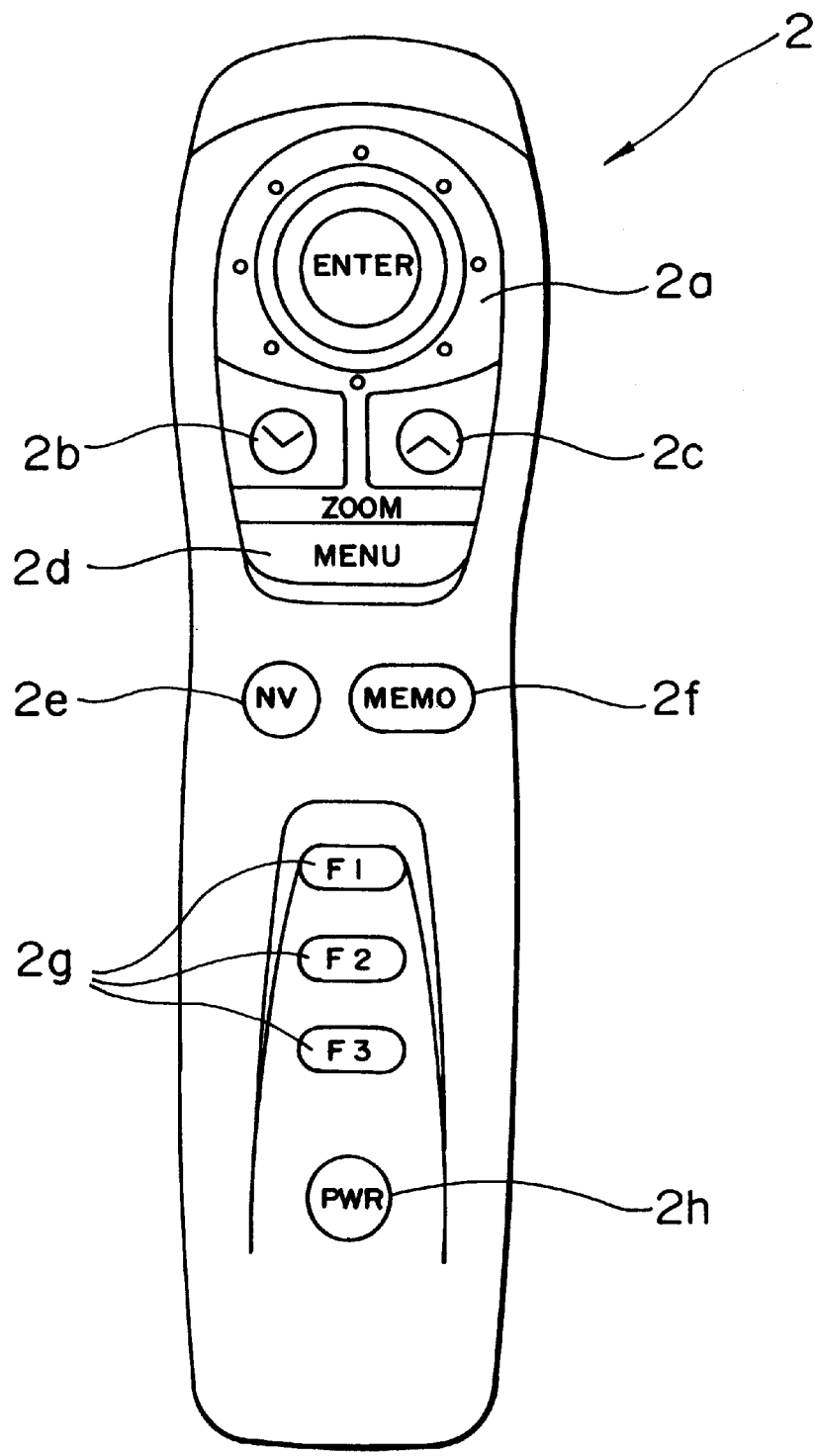
FIG. 3 shows an external appearance of a remote controller.

FIG. 3 shows the remote controller which has the various keys described below. Joystick key or enter key 2a is operated to move a cursor (focus), a user's vehicle mark or the like in eight directions relative to a map or to select a desired menu item by moving the a menu selecting bar in vertical and horizontal directions, and which is depressed when a menu is selected. This key is hereinafter referred to as the "joystick key" when operated to input a direction and as the "enter key" when depressed in a vertical direction to input a focus position or a menu item. Enlargement key 2a is operated to display a map on a large enough scale to show a detailed map. Reduction key 2c is operated to display a wide-area map. Menu key 2d is operated to display a menu. Key 2e is a navigation (NV) key for displaying a map having a point corresponding to the user's vehicle position along with the user's vehicle mark. Key 2f is a memory (MEMO) key operated to store a desired point. Functions frequently used are set in combination with function keys 2g and are each selected by operating the corresponding one of function keys 2g. Key 2h is a power key.

(c) Display Picture and Menu

Figure 4:
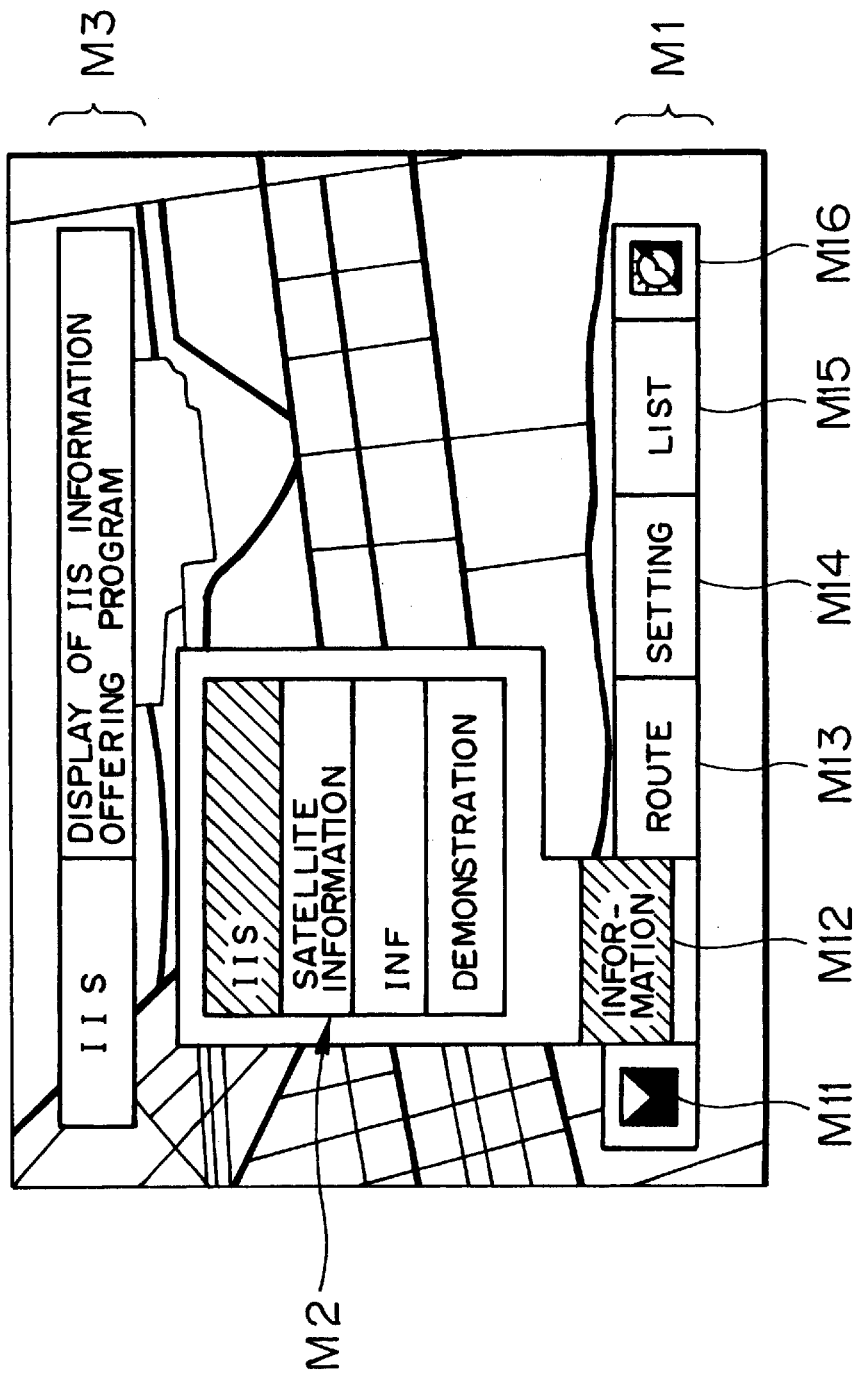
FIG. 4 shows a picture on a display.

FIG. 4 illustrates a display picture. At the time of route guidance or the like, a map is displayed on the display screen, and a main menu M1, a sub menu M2 and guide information M3 are displayed by a menu call operation of the menu key 2d. If, in such a state, the joystick key 2a is operated to position a menu selecting bar on the position of a desired main menu item (item "information" M12 in the illustration), the sub menu M2 belonging to the main menu item is displayed above the main menu item. Thereafter, the joystick key 2a can be operated to position a sub menu selecting bar on the position of a desired sub menu item (IIS in the illustration), followed by depression of the enter key. This sub menu is thereby opened to execute a function according to the sub menu.

FIG. 5 is a table of menus. Six kinds of menus are provided as main menus. Main menu 11 is a map display change menu including, as display methods, (1) a heading-up display, (2) a north-up display, (3) a front-wide display, and (4) a scalable display. Main menu "information" M12 is for inputting instructions (1) to select and display predetermined IIS information, (2) to display the state of receiving from the satellite, (3) to select information symbols (INF) to be displayed on a map, and (4) to start demonstrating the operation of the navigation apparatus.

Main menu "route" M13 is for (1) setting a destination and a transit point (setting a simple guide route), (2) setting an on- or off-state of guidance along a guidance route, an on- or off-state of voice guidance at an intersection and on- or off-state of display of an enlarged diagram at an intersection, (3) setting a detailed route (detailed guidance route) by simulation and (4) selecting a display of the remaining distance or the like.

Main menu "setting" M14 is for (1) selecting a GPS error correcting method (MM setting), (2) changing the user's vehicle mark, (3) changing the CD-ROM disk drive, (4) setting environmental conditions by turning on or off a time signal, the initial picture, guide information and the like, (5) setting a home position, (6) changing a home mark, and (7) setting an on- or off-state of traveling locus display.

Main menu "list" M15 is for (1) inputting instructions to turn on or off the operation of storing a traveling locus, to keep (lock) or remove (unlock) the traveling locus and to delete the traveling locus (in a locus list), (2) drawing a map showing an area about a registered point (in a point list), (3) selecting and displaying a registered route (simple guide route or detailed guide route), and (4) setting functions with respect to the function keys (key macro). Main menu M16 is for adjusting a color in which a map is displayed and the brightness of the map image.

(B) Navigation Controller

FIG. 6 shows the configuration of the navigation controller 1 along with the remote controller 2, the display unit 3, the CD-ROM 4 in which map information is stored, and the CD-ROM drive 5. The GPS receiver, the self-contained navigation sensor and so on are not illustrated.

The navigation controller 1 has a map reading control section 11 for (1) calculating a focus position (picture center position) Pc when the operation of moving a map or selecting a map area by the joystick key, the reduction key, the enlargement key or the like, and (2) reading predetermined map information from the CD-ROM 4 on the basis of the vehicle position, the focus position or the like. Switch 12 controls outputting map data to a selected section. A map buffer 13 stores map information read out from the CD-ROM. Map information of a plurality of pages (units), e.g., 3×3 units of map information about the vehicle position or the focus position is read to the map buffer to enable map scrolling described below. At the time of demonstration, when map data is read out from the CD-ROM to the map buffer 13, a demonstration map storage section 14 simultaneously stores the map data.

Map drawing section 15 generates a map image by using map information stored in the map buffer 13. Video random access memory (VRAM) 16 stores the map image. Read control section 17 displays a map while scrolling the same according to the movement of the vehicle position or focus movement by changing the position of one picture cut out from the VRAM 16 on the basis of the picture center position (vehicle position, focus position).

Intersection enlargement drawing section 18 displays an enlarged figure of an intersection (1) at the time of demonstration of intersection guidance, (2) when the vehicle mark reaches the intersection during the process of setting a detailed route (detailed guide route) by simulation or (3) when the vehicle reaches a point at a predetermined distance from the intersection during actual route guidance. Remote controller control section 19 receives a signal according to an operation of the remote controller and outputs an instruction to the corresponding sections.

Demonstration control unit 20 has a demonstration control section 20a for overall demonstration control, a demonstration run control section 20b for controlling formation of a demonstration route, for controlling travel of the vehicle position mark along the demonstration route and for controlling drawing of the demonstration route, and a demonstration route storage section 20c for storing the demonstration route thereby formed. As shown in FIG. 7, the demonstration route storage section 20c stores the position of each node of a formed demonstration route and an intersection flag indicating whether the node corresponds to an intersection.

A demonstration route drawing section 21 generates a demonstration route image. Operating picture generating section 22 displays an operating picture for demonstration (menu picture) by an instruction from the demonstration control section 20a, and, at the time of the operation other than demonstration, forms a predetermined operating picture (menu picture) by the operation of the menu key, the joystick key or the like. Mark generating section 23 forms the vehicle mark, a focus mark and other marks. Image synthesis section 24 drives display 3.

(C) Demonstration Processing

Figure 8:
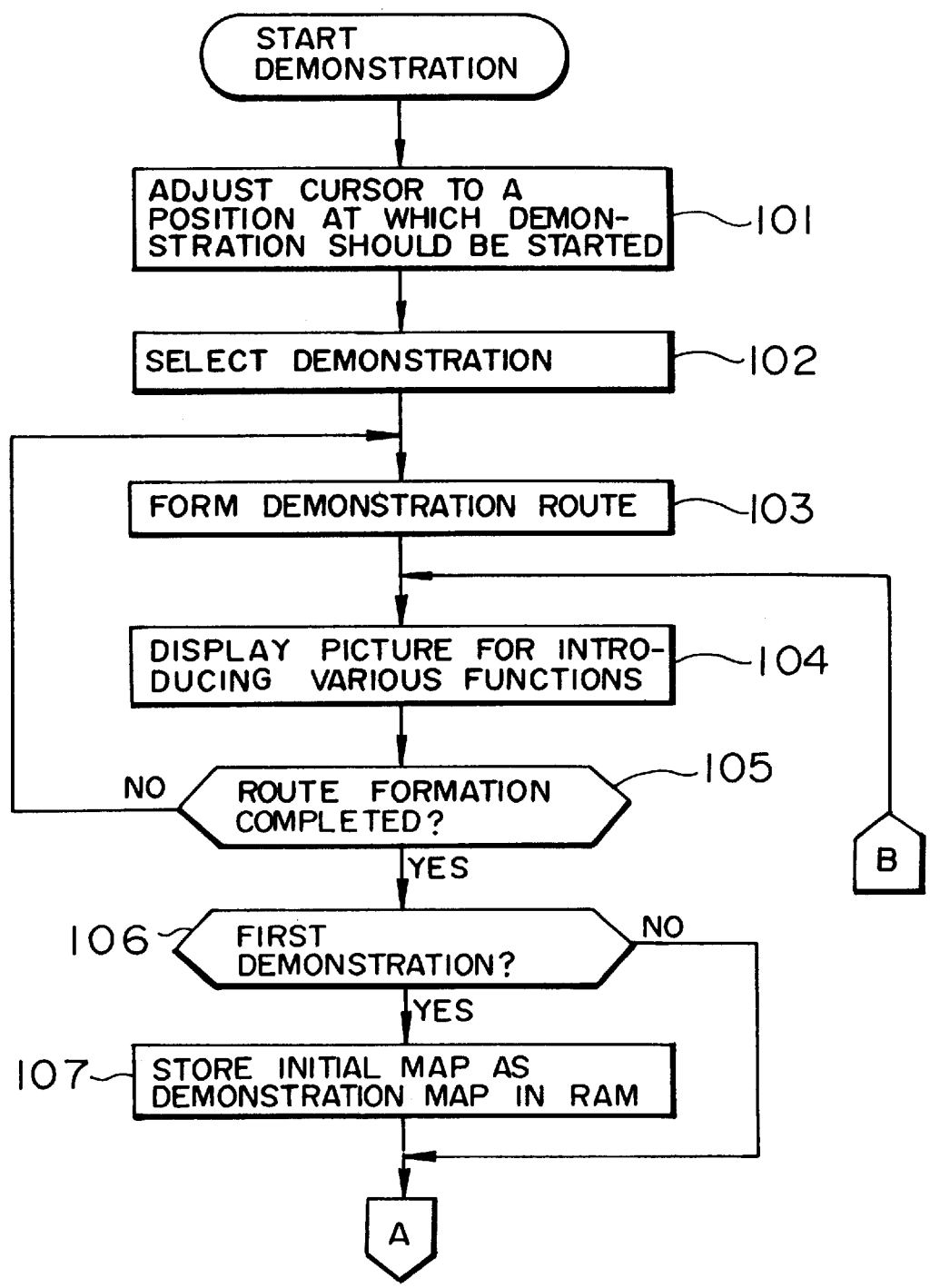
FIG. 8 is a flowchart of demonstration processing.
Figure 9:
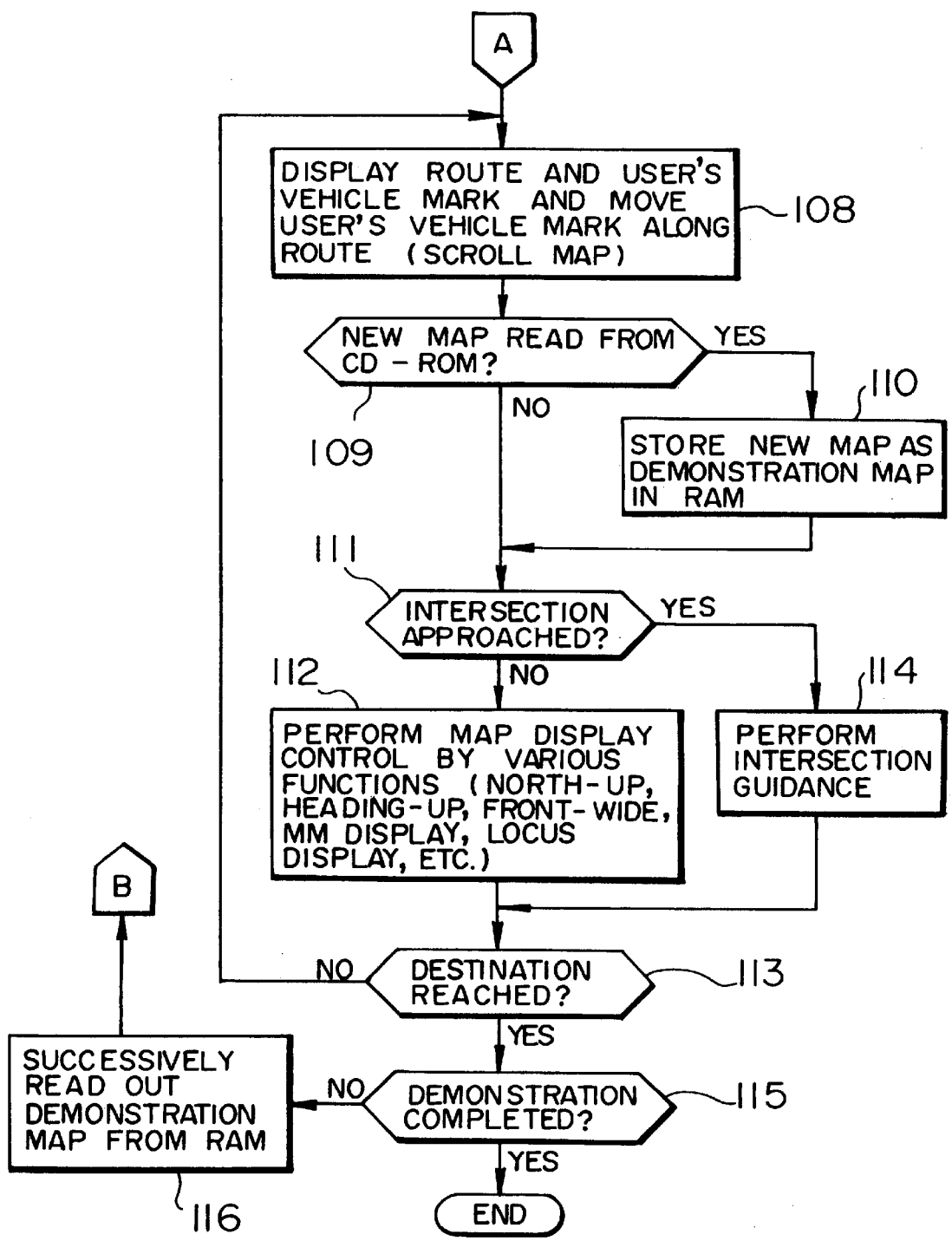
FIG. 9 is a flowchart of demonstration processing continued from FIG. 8.
Figure 10:
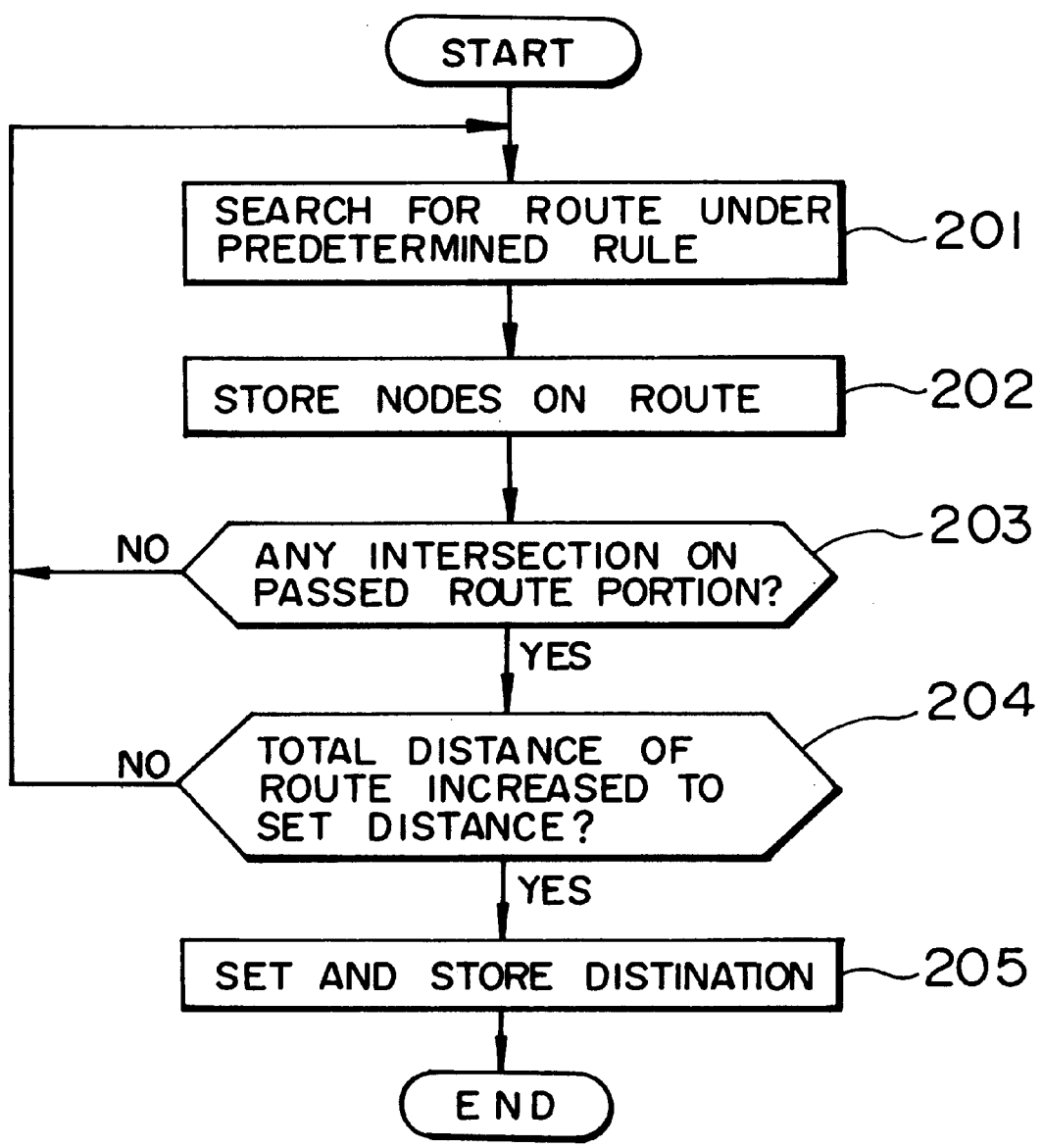
FIG. 10 is a flowchart of demonstration route forming processing.

FIGS. 8 and 9 show a demonstration processing flow, and FIG. 10 shows a demonstration route forming processing flow, these flows illustrating a computer program executed by navigation unit 1. A suitable computer program can be written in light of the present description. According to the present invention, a demonstration can be performed by using a map containing an arbitrary point. Accordingly, there is a need to designate a demonstration region and to form a demonstration route.

Figure 11A:
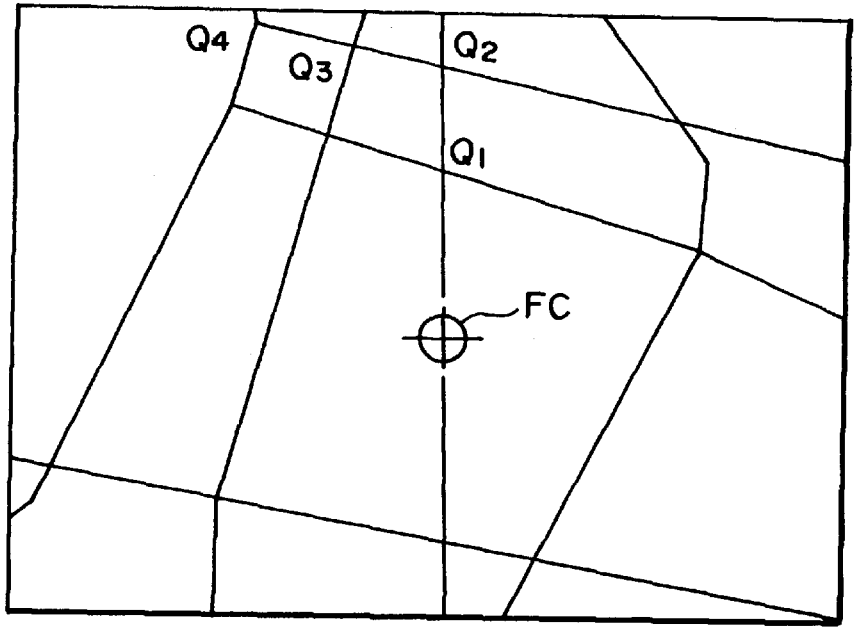
FIGS. 11A and 11B are diagrams showing demonstration route forming processing.
Figure 11B:
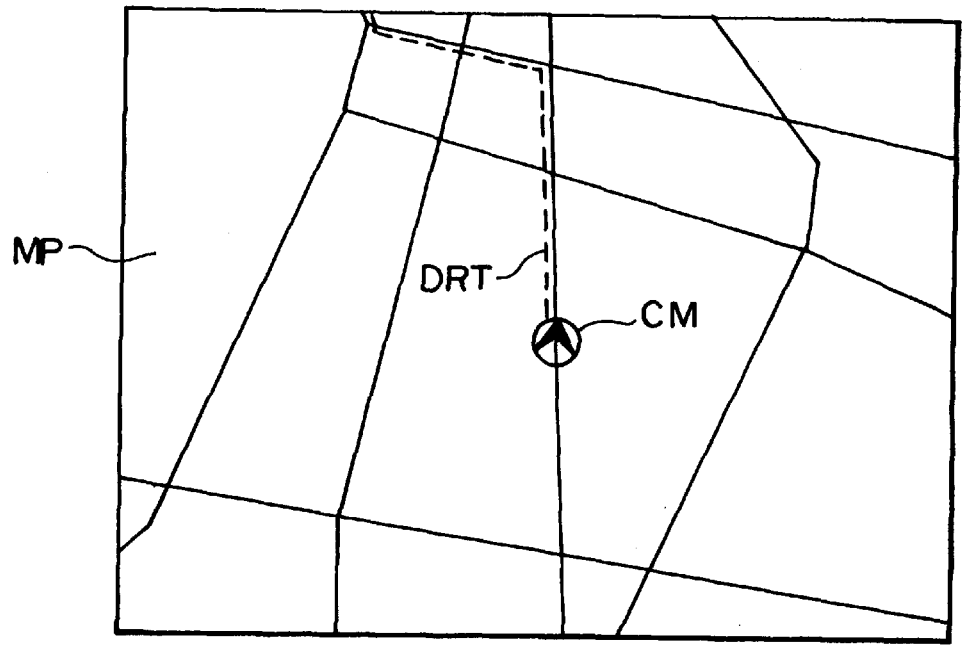

While a map is shown on the display screen, the map is moved by the operation of the joystick key 2a, the reduction key 2b, the enlargement key 2c or the like, whereby focus FC displayed at a center of the screen is positioned at a demonstration route starting position in the demonstration area (Step 101, FIG. 11(*a*)).

The menu key 2d is operated to open the menu picture and to designate the item "demonstration" (Step 102). In response to this, the demonstration control section 20a instructs the demonstration run control section 20b to form a demonstration route and also instructs the map drawing section 15 to stop map image generation until the demonstration route is completed. As a result, a map image such as that illustrated in FIG. 11(*a*) is displayed on the display screen for a certain period of time. If necessary, an image presenting various functions is displayed by being superposed on the map shown in FIG. 11(*a*).

The demonstration run control section 20b starts forming a demonstration route by the demonstration route forming instruction (Step 103). Since a certain period of time is required for route searching, the demonstration control section 20a controls the operating picture generating section 22 to generate an image presenting various functions in this time period (Step 104). Thereafter, the present processing is checked as to whether the demonstration route formation is completed (Step 105). If the demonstration route formation is not yet completed, the processing of Steps 103, 104 and 105 is continued until the demonstration route formation is completed.

In the demonstration route forming step 103 (see FIG. 10), the demonstration run control section 20b starts by forming a demonstration route according to a predetermined rule (Step 201). For example, the route formation assumes that the vehicle passes intersections by repeating a cycle of running straight→turning to the left→running straight→turning to the right after the starting point.

Accordingly, the demonstration run control section 20b first stores the focus position Pc input by the map reading control section 11 as a route staring point in the demonstration route storage section 20c (See FIG. 7).

Next, the demonstration run control section 20b obtains a series of nodes (node position, intersection discrimination flag) in a route to the next intersection Q1 by using the road layer information read out to the map buffer 13, the focus position and traveling direction, and stores this series of nodes in the demonstration storage section 20c. The demonstration run control section 20b also reads out intersection position information CPD and inputs the same to the map reading control section 11. The map reading control section 11 makes a determination on the basis of intersection position information CPD as to whether there is a need to read out a new map. If reading a new map is required, the map reading control section 11 reads out an Adjacent map to the map buffer 13, followed by the same map reading control (Step 202).

Thereafter, the demonstration run control section 20b determines whether there is an intersection passed by a right turn or a left turn in the demonstration route from the starting point to the present intersection (Step 203). If no intersection exists as such an intersection, the processing of Step 201 and the subsequent steps is repeated. This step is provided for the purpose of drawing an enlarged intersection figure of such a right- or left-turn intersection during demonstration.

Subsequently, in Step 201, a series of nodes to the next intersection Q2 is determined assuming that intersections are passed in order of running straight→turning to the left→running straight→turning to the right, and map data is read out of the CD-ROM to the map buffer if necessary.

If it is determined in Step 203 that an intersection passed by a right or left turn exists in the demonstration route from the starting point to the present intersection, the present situation is checked as to whether the total travel distance through the demonstration route has become equal to a set distance (e.g., 3 km) (Step 204). If the set distance has not been reached, the processing of Step 201 and the subsequent steps is repeated.

When the total distance of the demonstration route becomes equal to or larger than the set distance by the above-described operation, the final intersection is stored as a destination (demonstration route end point) in the demonstration route storage section 20c, and the demonstration control section 20a is informed of this result, thereby completing the route formation processing (Step 205).

In response to the information of the completion of demonstration route formation, the demonstration control section 20a checks the present situation as to whether the present cycle of demonstration is a first one (Step 106). If YES, the demonstration control section 20a instructs the switch 12 to store in the map buffer 13 map data subsequently read out from the CD-ROM and the demonstration map storage section (RAM) 14. The demonstration control section 20a also informs the map reading control section 11 of the completion of demonstration route formation. In response to this information, the map reading control section 11 reads out the map information before the start of demonstration route formation and stores the read information in the map buffer 13 and the demonstration map storage section 14 (Step 107).

Next, the demonstration control section 20a instructs the map drawing section 15 to restart map drawing, instructs the demonstration route drawing section 21 to draw the demonstration route and instructs the mark generating section 23 to draw the user's vehicle mark. Demonstration route DRT is thereby displayed in map MP on the display screen so that the roads of the route are discriminable from other roads. Also, vehicle mark CM is displayed at the center of the screen.

Thereafter, the demonstration control section 20a instructs the demonstration run control section 20b to start a demonstration run. The demonstration run control section 20b successively reads out the series of nodes of the demonstration route from the demonstration route storage section 20c and inputs the series of nodes to the map reading control section 11. The map reading control section 11 calculates the map position of the center of the picture on the basis of this series of nodes so that the vehicle mark moves at a predetermined speed for a simulation run along the demonstration route. The read control section 15 changes the image cutting-out position according to the change in the map position of the picture center to scroll the map (Step 108).

If new map information is required for map scrolling, the map reading control section 11 reads out map information from the CD-ROM 4 and stores the information in the map buffer 13 and the demonstration map storage section 14 (Steps 109 and 110).

In parallel with the above-described simulation run of the vehicle mark along the demonstration route, the demonstration run control section 20b checks the present situation as to whether the vehicle mark has reached a point at a predetermined distance from a right-turn or left-turn intersection (Step 111). If such a point has not been reached, the demonstration control section 20a intermittently demonstrates various functions of the navigation apparatus one after another (Step 112). For example, if the map display methods are to be first presented as demonstrated functions, the demonstration control section 20a controls the operating picture generating section 22 to display a map display method selection menu picture and to automatically select the predetermined display methods (north-up, heading-up, frontwide and scalable methods). The demonstration control section 20a informs the map drawing section 15 of one of the Display method selected. The map, the guide route and the vehicle mark are drawn by the selected display method. In this state, the vehicle mark is moved along the demonstration route to show a demonstration run. After elapse of a predetermined time period, the map display method selection menu picture is displayed and another one of the display methods is automatically selected. The map, the guide route and the vehicle mark are drawn by the selected display method, and, in this state, the vehicle mark is moved along the demonstration route for a demonstration run. Successively, the map display, the guide route and the vehicle mark are also drawn by the other display methods and the vehicle mark is moved along the demonstration route for a demonstration run. FIGS. 12(a), 12(b) and 12(c) illustrate examples of north-up display, heading-up display and front-wide display, respectively.

Next, the present situation is checked as to whether the destination (demonstration end point) has been reached (Step 113). If the destination has not been reached, the processing of Step 108 and the subsequent steps is repeated. Then, in Step 112, a map enlargement/reduction demonstration, a traveling locus display demonstration, a map matching display demonstration, and other function presentation demonstrations are successively performed in the function presentation order. When a point at a predetermined distance from a right-turn or left-turn intersection is reached by the vehicle mark approaching the intersection, the result of Step 111 is "YES" and the demonstration run control section 20b inputs the node number and entering and exiting links of the approached intersection to the intersection enlargement drawing section 18 and instructs the same to form an intersection guidance diagram (an enlarged intersection diagram with an arrow indicating the traveling direction). The intersection guidance enlargement drawing section 18 thereby reads out intersection information of the designated intersection from the map buffer 13 and forms and displays an enlarged intersection diagram and an arrow indicating the traveling direction in an upper light area of the display screen, as shown in FIG. 13 (Step 114).

Subsequently, while the vehicle mark is being moved along the above-described demonstration route, intersection guidance diagrams and navigation function presentation pictures are displayed as desired. When the vehicle mark reaches the route end point, the present situation is checked as to whether the apparatus has been operated to terminate demonstration processing (Step 115). If no demonstration terminating operation has been performed, the map reading control section 11 is instructed to thereafter read out the map from the demonstration map storage section 14 and to display the map read out. The map reading control section 11 thereby reads out the map necessary for a subsequent cycles of demonstration from the demonstration map storage section 14 and stores the map in the map buffer 13 (Step 116). Thus, the CD-ROM is not accessed at the second and subsequent cycles of demonstration and wear and tear of the CD-ROM drive are therefore limited, thereby extending its life. At the second and other subsequent cycles of demonstration, processing of Step 110 is not executed.

The present invention has been described with respect to one embodiment. The present invention, however, includes other various changes and modifications which may be made without departing from the scope of the invention defined in the appended claims.

According to the present invention, as described above, when map data for demonstration is read out from a disk-like medium, the map data is stored in a memory and demonstration is performed based on this data. If the demonstration is successively repeated, the map data is read out from the memory for the subsequent cycle of demonstration. Therefore, even if the demonstration is continuously repeated, it is not necessary to access the CD-ROM drive in the second and other subsequent cycles of demonstration. As a result, the life of the CD-ROM can be extended.

Also, according to the present invention, the demonstration is performed such that a demonstration region is arbitrarily set, a demonstration route is formed in this region, and a navigated vehicle mark is moved along the formed demonstration route while a corresponding map is being displayed. In this process, therefore, the demonstration can be performed by drawing a map for any region, that is, demonstration can be performed with respect to a region familiar to a driver, so that the driver can more easily understand the demonstration. Moreover, since the demonstration region can be changed, the demonstration can be performed even if the CD-ROM is changed.

What is claimed is:

1. A method for demonstrating the operation of at least one function of a navigation apparatus having a plurality of functions, comprising the steps of:

selecting a desired map region from a plurality of map regions;

reading from a storage medium all map data for said demonstration corresponding to the selected map region;

storing the read out map data in a memory;

forming a demonstration route in said selected map region according to a predetermined rule without operating an optimal route setting function of the navigation apparatus;

storing the formed demonstration route in said memory; and performing said demonstration of a route indication function of the navigation apparatus by moving a mark indicating a navigated vehicle along the formed demonstration route while displaying the stored read out map data, and without any further access to said storage medium during said demonstration.

2. A demonstration method according to claim 1, wherein said storage medium is a disk.

3. A demonstration method according to claim 1, wherein said demonstration starts by a step of selecting an item which designates a start of said demonstration, the selecting being from a predetermined menu.

4. A demonstration method according to claim 1, where, in said step of performing said demonstration, at least one of a plurality of map display methods is automatically selected and said demonstration is performed according to the selected map display method.

5. A demonstration method according to claim 1, wherein, in said step of performing said demonstration, a second one of the map display methods is automatically selected after a predetermined time, and said demonstration is restarted according to the second selected map display method.

6. A demonstration method according to claim 4, wherein said map display method is one of a north-up, a heading-up, a front-wide and a scalable display method.

7. A demonstration method for a navigation apparatus according to claim 4, wherein said demonstration is at least one of a map enlargement reduction demonstration, a traveling locus display demonstration, and a map matching display demonstration.

8. A navigation apparatus according to claim 2, wherein when said demonstration run control section forms said demonstration route, it determines the position of a node of said demonstration route and an intersection flag indicating whether said node corresponds to an intersection, and stores the position of said node and said intersection flag in said demonstration route memory.

9. A navigation apparatus having the ability to demonstrate at least one of a plurality of functions in which map data of a region upon which a navigation demonstration is to be performed is read from a storage medium, said navigation demonstration being performed while a corresponding map is being displayed on a display unit, said apparatus comprising:

a region selecting section for selecting a map region, from a plurality of map regions, upon which said navigation demonstration is to be performed;

a demonstration run control section for forming a demonstration route in the region selected by said region selecting section, said demonstration route being formed according to a predetermined rule without operating an optimal route setting function of the navigation apparatus;

a demonstration route memory for storing said demonstration route; and a demonstration control section for performing said navigation demonstration by storing in said demonstration route memory said demonstration route and without any further access of said storage medium during said navigation demonstration, while moving a vehicle mark along said demonstration route.

10. A navigation apparatus according to claim 9, wherein said demonstration route memory stores at least the position of a node of said demonstration route.

11. A navigation apparatus in which map data of a region upon which a navigation demonstration is to be performed is read from a storage medium, a function demonstration being performed while a corresponding map be being displayed on a display unit, said apparatus comprising:

a region selecting section for selecting a region upon which said navigation demonstration is to be performed;

a demonstration run control section for forming a demonstration route in the region set by said region selecting section;

a demonstration route memory for storing said demonstration route; and a demonstration control section for performing said navigation demonstration by storing in said demonstration route memory said demonstration route, while moving a vehicle mark along said demonstration route; wherein when said demonstration run control section forms said demonstration route, it determines the position of a node of said demonstration route and an intersection flag indicating whether said node corresponds to an intersection, and stores the position of said node and said intersection flag in said demonstration route memory.

* * * * *

UNITED STATES PATENT AND TRADEMARK OFFICE
CERTIFICATE OF CORRECTION

PATENT NO. : 6,064,322
DATED : May 16, 2000
INVENTOR(S) : Masaaki Ohira

It is certified that error appears in the above-identified patent and that said Letters Patent is hereby corrected as shown below:

Title Page
Item [73], after "Inc.," please insert -- Tokyo --.

In the Claims

Claim 5,
Line 1, please change "1" to -- 4 --.

Claim 8,
Line 1, please change "2" to -- 9 --.

Claim 11,
Line 4, please change "map be" to --map is --.

Signed and Sealed this

Seventh Day of August, 2001

*Attest:*

*Attesting Officer*

NICHOLAS P. GODICI
*Acting Director of the United States Patent and Trademark Office*